Dec. 23, 1941. E. WILDHABER 2,267,181
GEAR CUTTER
Filed Dec. 22, 1937 7 Sheets-Sheet 1

Ernest Wildhaber
INVENTOR
BY
ATTORNEY

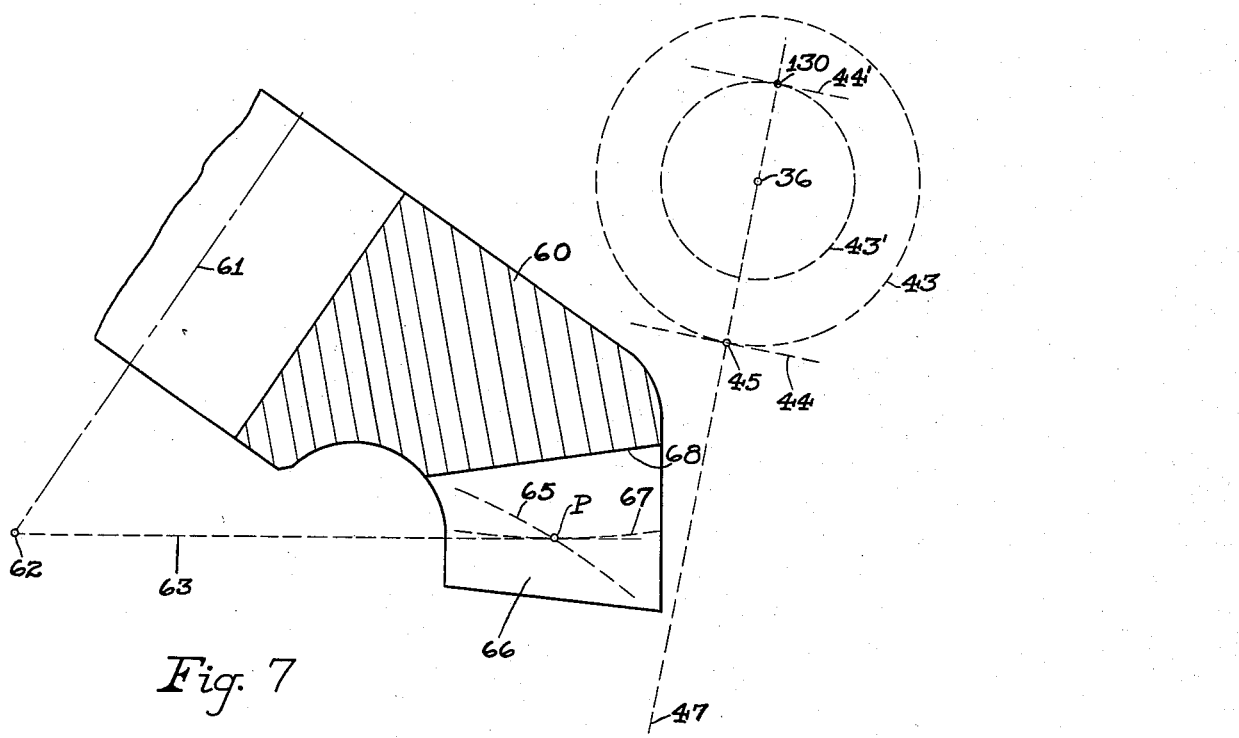

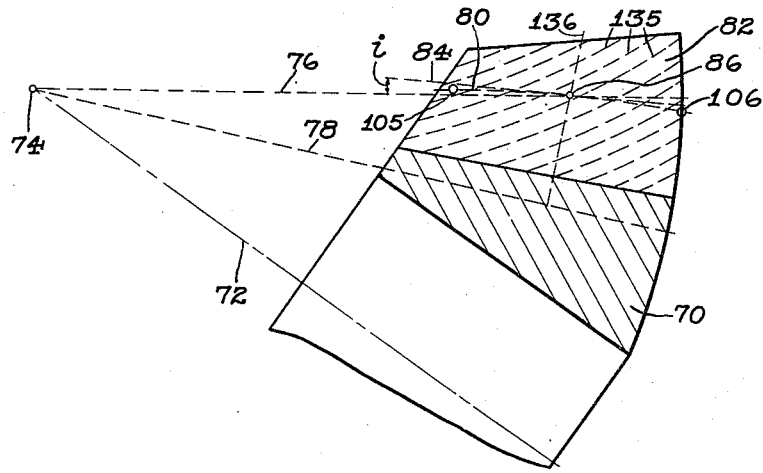
Fig. 8
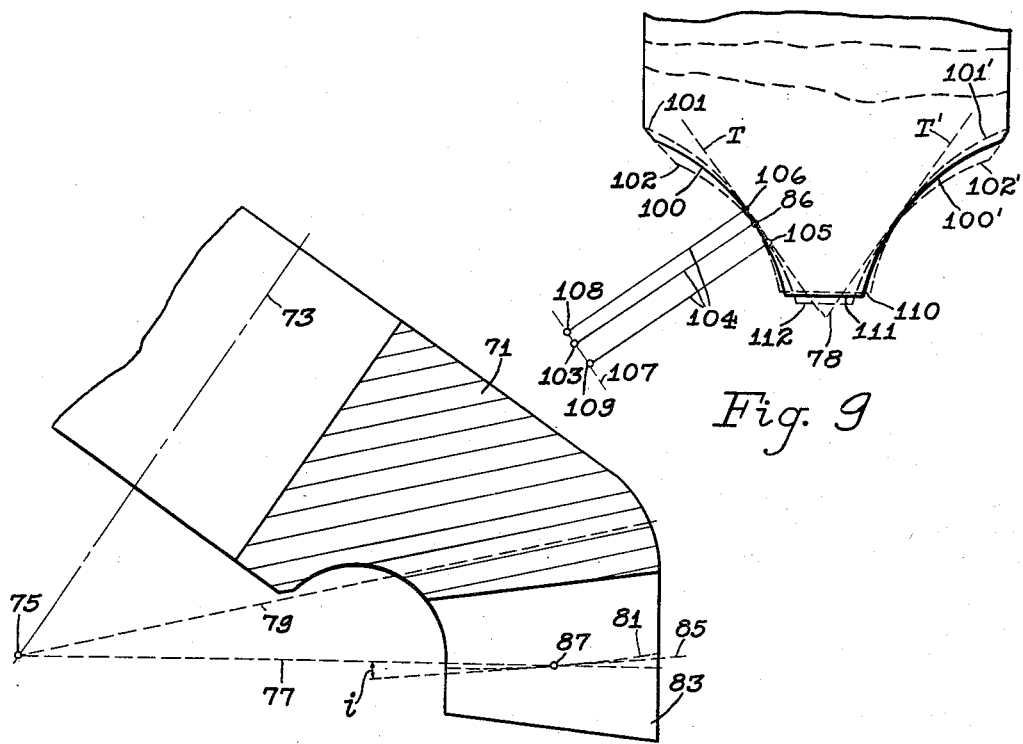
Fig. 9
Fig. 10

Dec. 23, 1941.     E. WILDHABER     2,267,181
GEAR CUTTER
Filed Dec. 22, 1937     7 Sheets-Sheet 4

Ernest Wildhaber
INVENTOR
BY [signature]
ATTORNEY

Dec. 23, 1941.  E. WILDHABER  2,267,181
GEAR CUTTER
Filed Dec. 22, 1937  7 Sheets-Sheet 5

Ernest Wildhaber
INVENTOR
BY
ATTORNEY

Dec. 23, 1941.  E. WILDHABER  2,267,181
GEAR CUTTER
Filed Dec. 22, 1937  7 Sheets-Sheet 6
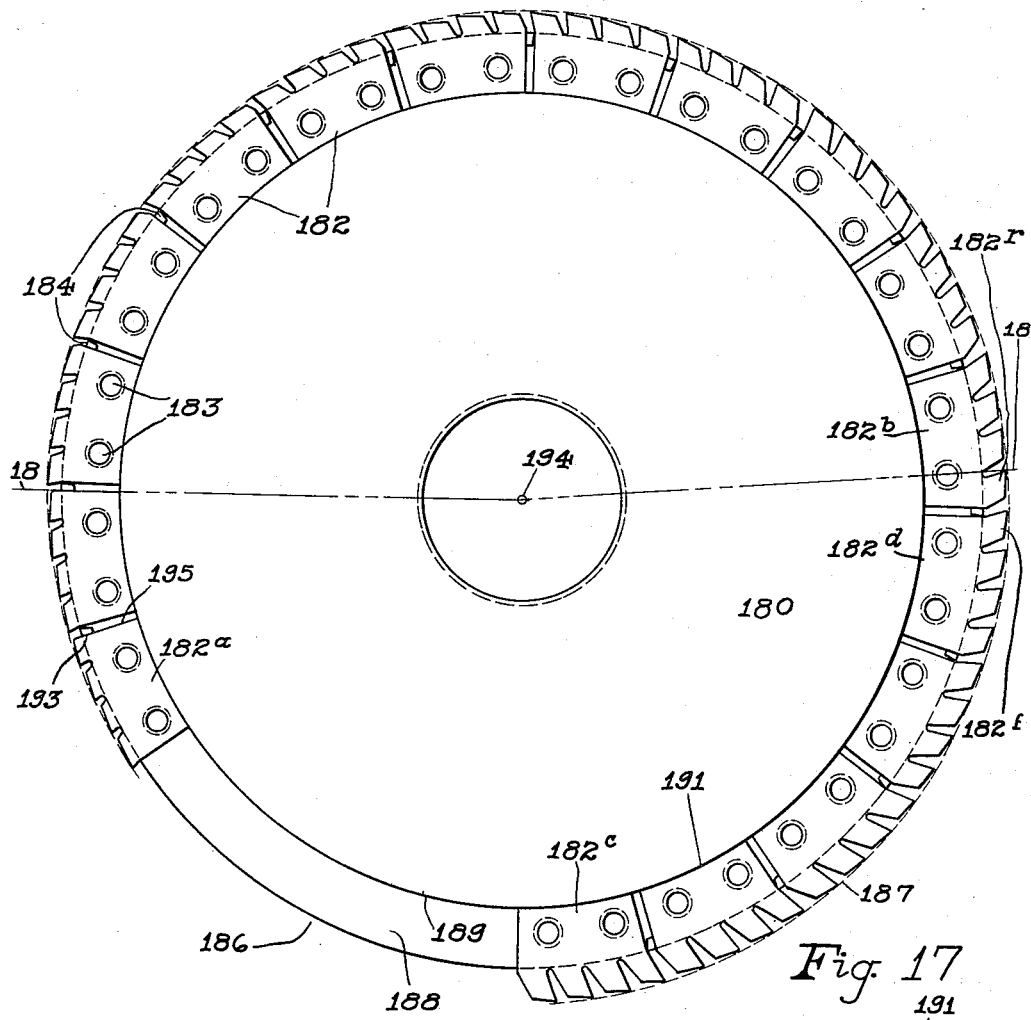
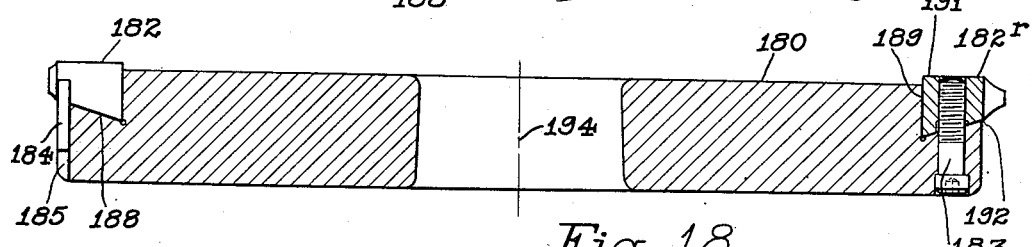
Ernest Wildhaber
INVENTOR
BY
ATTORNEY Dec. 23, 1941. E. WILDHABER 2,267,181
GEAR CUTTER
Filed Dec. 22, 1937 7 Sheets-Sheet 7

Ernest Wildhaber
INVENTOR
BY *Schlesinger*
ATTORNEY

Patented Dec. 23, 1941

2,267,181

UNITED STATES PATENT OFFICE 2,267,181

GEAR CUTTER

Ernest Wildhaber, Irondequoit, N. Y., assignor to Gleason Works, Rochester, N. Y., a corporation of New York Application December 22, 1937, Serial No. 181,177

29 Claims. (Cl. 29—105)

The present invention relates to gears and to their manufacture and particularly to straight and skew-toothed bevel and hypoid gears and to tools for and to methods of manufacturing such gears. The invention is an improvement upon the invention of my prior application Serial #164,340, filed September 17, 1937. It comprises a new and improved form of bevel gearing, a novel method of manufacture of gears and particularly bevel gears, and a new and improved form of cutter for use in carrying out this method. The claims of the present application are confined to the new cutter. The new cutting method is claimed in my co-pending application, Serial No. 360,437, filed October 9, 1940.

In my prior application I have disclosed a method of cutting gears in which a rotary disc cutter is employed that has a plurality of cutting blades arranged part-way around its periphery with a gap between the last and first blades and in which the gear may be cut by rotating the cutter in engagement with a gear blank while holding the blank stationary and producing a relative feed movement between the cutter and blank along the teeth of the blank and indexing the blank when the gap in the cutter is abreast of the blank. The cutter may have a plurality of roughing blades followed by a plurality of finishing blades and the gear is then roughed during feed of the cutter in one direction across the face of the gear blank and is finished during return feed of the cutter.

Each blade of the cutter is coordinated to cut at a definite point along the length of the gear tooth and a tooth or tooth space may be completed in one revolution of the cutter.

The method of this prior application may be employed in the cutting of bevel or spur gears. For bevel gears, the cutter has blades whose side-cutting edges are of circular arcuate profile but the profile curvature varies on different cutting blades. The blades of larger profile radius cut at the large end of the gear teeth and the blades of smaller profile radius cut at the small end of the teeth. To obtain taper in tooth depth from the large to the small end of the teeth, the blades of the cutter are made of varying height and the top cutting edges of the blades are arranged on a spiral.

As in my prior application, it is one purpose of the present invention to provide a method of cutting gears in which a gear tooth space or a side of a gear tooth may be finished in a single revolution of a disc cutter. The cutter is fed along the length of the gear tooth as it rotates. Hence, as in my prior application, it is necessary to coordinate each blade or cutting edge, especially each finishing edge of the cutter to a definite part along the length of the gear tooth and the blade or cutting edge must be shaped to be conjugate to that part of the tooth. For tapered gears, then, just as in my prior application, the finishing edges of the cutter have to be shaped to produce a changing profile shape as the cutter moves along the length of the tooth.

A principal object of the present invention is to provide a simpler form of cutter than that proposed in my prior application, one which will be easier to manufacture and therefore cheaper. A related object is to provide a cutter which will have substantially circular cutting edges of constant profile but a cutter which will be capable nevertheless of producing tooth surfaces of varying profile shape along the length of the tooth surface.

Another object of the present invention is to provide a disc cutter of the type described whose different cutting edges can readily be relief-ground with the same grinding wheel and with the same portion of the grinding wheel.

Still another object of the invention is to devise a simple cutter of the type described whose cutting blades can readily be relief-ground in place, that is to say, in the same position which they occupy when cutting.

Another object of the invention is to provide a cutter of the type described and a method for employing the same which will permit of using one cutter to cut a wide variety of gears.

A still further object of the invention is to provide cutters for and a method of successively rough and finish-cutting straight toothed gears in a single operation which will be faster than any heretofore employed and simple.

A further object of the invention is to provide a form of gearing capable of being cut by the tool and method of the present invention and in which both members of a pair of gears may be cut without generating roll.

Other objects of the invention will be apparent hereinafter from the specification and from the recital of the appended claims.

With the present invention, a rotary cutter of disc form is employed that has a plurality of radially disposed cutting blades whose corresponding side-cutting edges have preferably circular arcuate profiles of identical radii of curvature. The centers of curvature of different blades are displaced from one another, however, and ordinarily in the direction of a tangent to the tooth surface being cut. In the cutter of my prior application, the radii of curvature of corresponding side-cutting edges vary for different blades of the cutter. The present cutter is, therefore, a much simpler tool to make and relief-grind since the radius of curvature of the cutting edges of different blades is constant.

The cutter of the present invention like the cutter of my prior application has its cutting blades arranged preferably only part-way around its periphery and there is a gap between the last and first blades of the cutter. The cutter may have all roughing or all finishing blades or part roughing and part finishing blades.

In one embodiment of the invention, too, separate cutters are employed for roughing and finishing and only the finishing cutter has blades of curved side profile.

In cutting a gear, the cutter is preferably adjusted into engagement with the gear so that it will cut to the full depth of the tooth spaces of the gear without relative depthwise feed and rotated on its axis while the blank is held stationary and while a relative movement is produced between cutter and blank along the length of a gear tooth in time with the cutter rotation, and the gear blank is indexed when the gap in the cutter is abreast of the blank.

The centers of profile curvature of the cutting edges of successive blades of the cutter may be displaced from one another either uniformly or non-uniformly. When a cutter is used that has uniform displacement of the centers of profile curvature, lengthwise variation in profile curvature of the teeth of the gear being cut, such as is required on tapered gears, may be obtained by varying the rate of feed of the cutter along the length of the gear teeth. When the cutter is made with non-uniform displacement of the profile centers of the blades, the desired variation in profile curvature of the gear can be obtained while feeding the cutter at a uniform rate along the length of the gear teeth. By varying the rate of feed, however, with either form of cutter, a single cutter can be used to cut gears having different variations in profile curvature along the length of its teeth. With the present invention moreover, opposite sides of the teeth of both members of a pair of gears can be cut simultaneously.

Variation in tooth depth from end to end on tapered gears may be obtained, as in my prior application, by making the blades of the cutter of varying height so that they will cut to different depths as the cutter is fed along the length of the gear tooth. The top cutting edges of the blades are arranged in a spiral which is conjugate to the straight bottom which it is desired to produce in the tooth spaces of the gear. If the cutter is fed at a uniform rate along the length of a gear blank, this spiral will be an involute spiral.

In the case of gears of coarser pitch, it is within the contemplation of the present invention to use separate cutters for roughing and finishing. Both operations, in fact, may be carried on simultaneously. Thus a pair of cutters may be employed, one a standard stocking cutter for roughing out the tooth slots and the other a finishing cutter made according to this invention for finishing the roughed out slots. The two cutters may be mounted coaxially to operate in adjoining tooth spaces. This feature of the invention is applicable also to spur gears as well as to bevels.

Bevel gears cut according to the present invention will have inherently a desirable localization of tooth bearing or contact, but the amount of localization of bearing may readily be modified by applying the principles of my prior Patent No. 1,733,326 of October 29, 1929.

Several different embodiments of the invention are illustrated in the accompanying drawings, in which:

Fig. 6 is a fragmentary axial sectional view of a bevel pinion formed according to the present invention, and illustrating diagrammatically certain principles of the present invention;

Fig. 7 is a fragmentary axial sectional view of the bevel gear which is to mate with the pinion shown in Fig. 6;

Figs. 8 and 10 are fragmentary axial sectional views of a pair of mating straight tooth bevel gears, which are shaped according to a modified embodiment of the present invention, and illustrating certain further principles of the invention;

Fig. 9 is a diagrammatic view showing the blades, which cut at the small end, the center of the face, and at the large end, respectively, of the tooth space of one of these gears, superimposed upon one another and showing how the cutting profiles of these blades differ;

Figure 12:
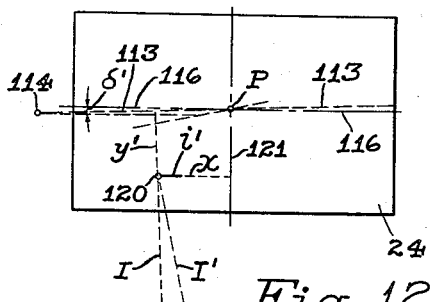
Figure 13:
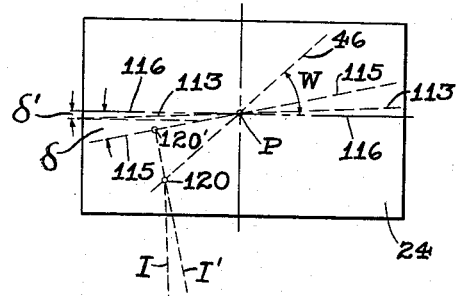
Figure 14:
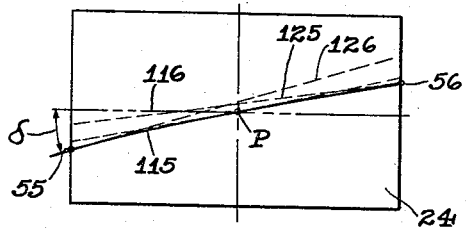
Figures 15, 16:
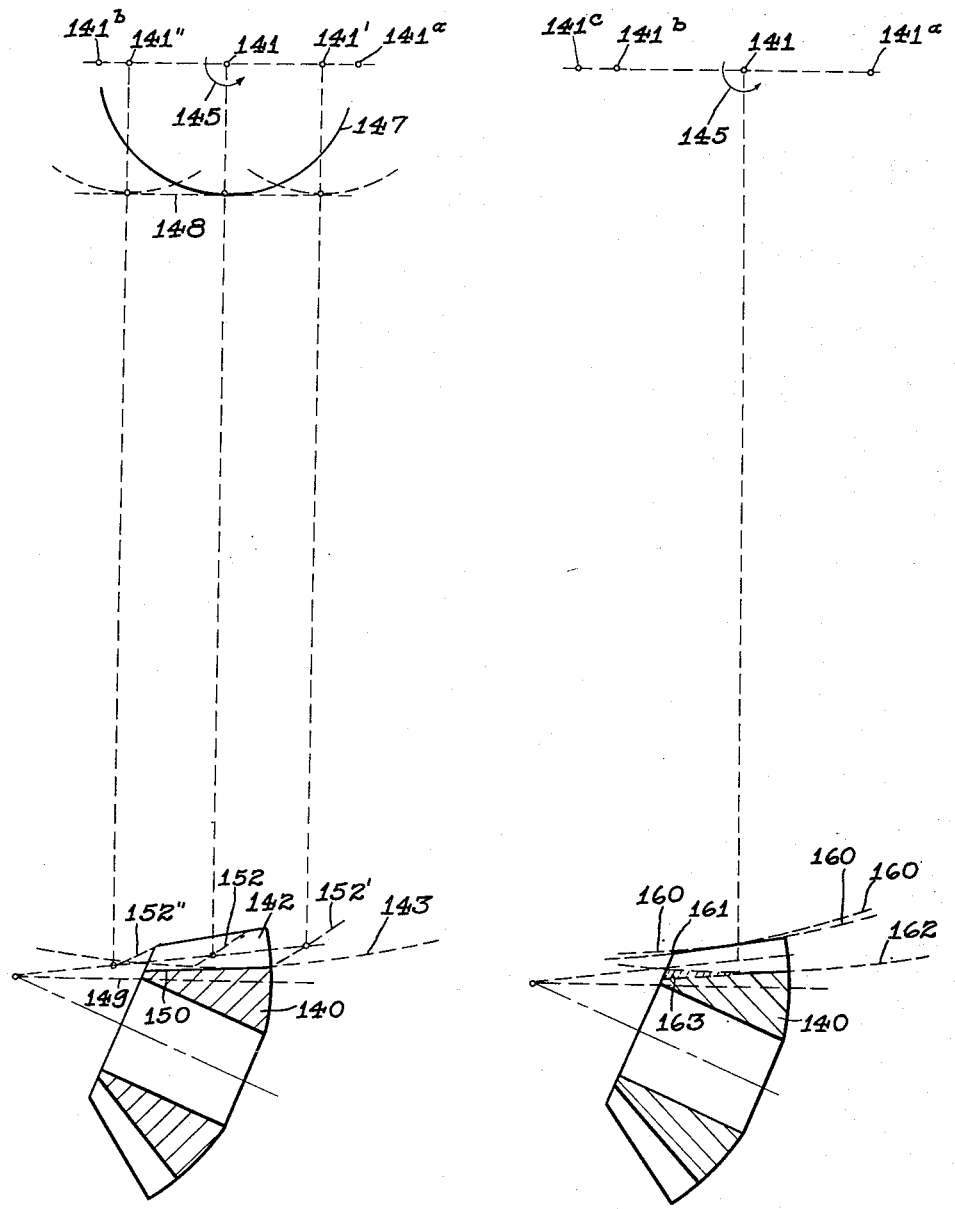
Figure 20:
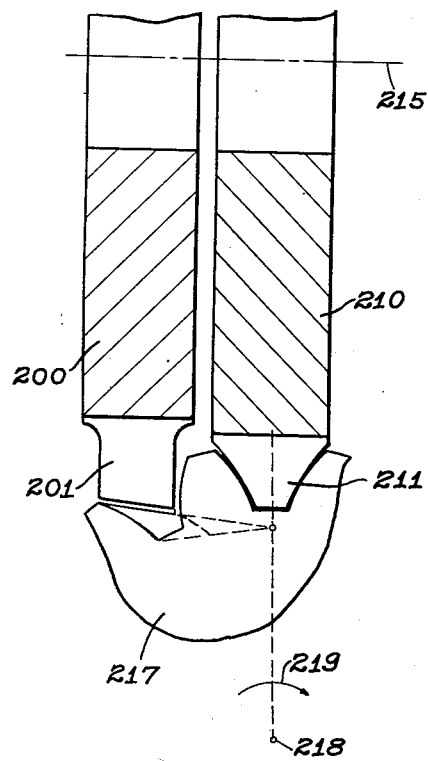
Figure 21:
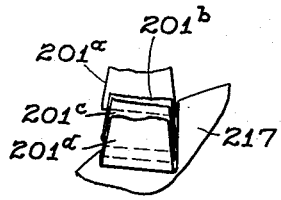
Figure 22:
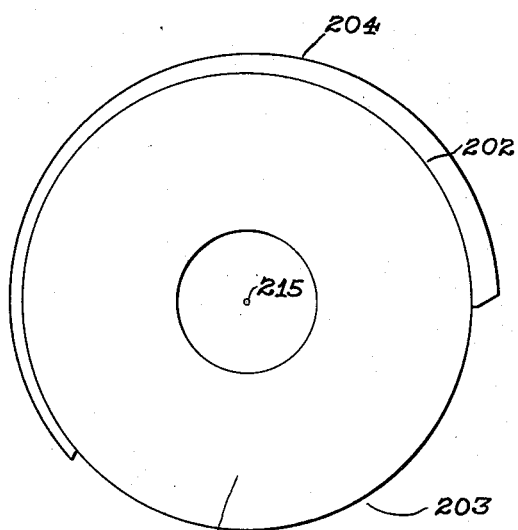
Figure 23:
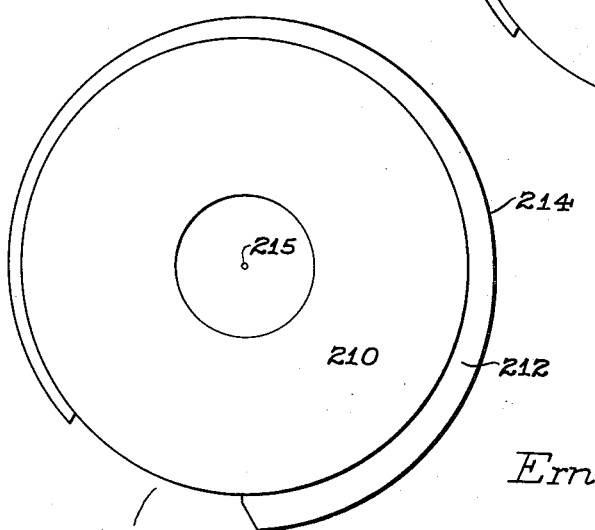

Figs. 12 to 14, inclusive, are diagrammatic views explanatory of the basic principles of the invention;

Fig. 15 is a diagrammatic view showing a bevel pinion in section and illustrating the motions employed in the cutting of the same according to the present invention;

Fig. 16 is another sectional view of this same pinion and illustrates diagrammatically the type of chips cut by a cutter made according to the present invention as the cutter rotates in engagement with the gear blank and is fed simultaneously across the face of the blank;

Fig. 17 is a side elevation of a cutter made according to one embodiment of this invention;

Fig. 18 is a sectional view of this cutter taken on the line 18—18 of Fig. 17;

Fig. 19 is a diagrammatic view showing one of the roughing blades of the cutter superimposed upon a finishing blade;

Fig. 20 is a view, showing a pair of roughing and finishing cutters and illustrating how they may be employed to simultaneously rough and finish-cut a bevel gear according to this invention;

Fig. 21 is a diagrammatic view illustrating the structure and operation of the roughing cutter of Fig. 20; and Figs. 22 and 23 are diagrammatic side elevational views of the roughing and finishing cutters, respectively, further illustrating the construction of these tools.

In a bevel gear, it is desirable to have the teeth and the tooth spaces taper in depth and in width from their outer to their inner ends so that the teeth of the gear may be of substantially uniform strength throughout their length. These desirable characteristics are maintained in bevel gearing made according to the present invention.

In Figs. 3 to 6 inclusive, 20 denotes a bevel pinion made according to one embodiment of the invention. The axis of this pinion is designated at 22. As is seen clearly in Fig. 6, the teeth 21 of this pinion decrease in depth from their outer to their inner ends and as will be seen by comparison of Fig. 4 with Fig. 3, the teeth and tooth spaces also decrease in width from their outer to their inner ends, and the profile shapes of the teeth also correspondingly change from end to end. The sides of the teeth at the small end are more curved than at the large end.

Figure 5:
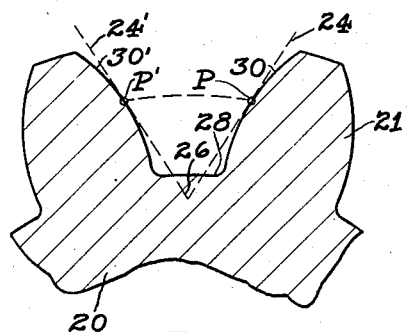
Fig. 5 is a sectional view of the gear on a somewhat enlarged scale and taken on the line 5—5 of Fig. 6.
Figure 4:
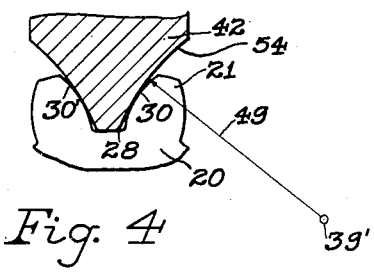
Fig. 4 is a diagrammatic view showing the cutter in operation at the small end of the tooth space of this tapered gear and showing the shape of the cutter blade which cuts at this end of the tooth space.

In Figs. 5 and 6, the points P and P' are mean points in the opposite sides of a tooth of the gear 20. The planes 24 and 24' are tangent to the opposite sides of the tooth space at the points P and P', respectively. As on conventional bevel gears, these planes pass through the apex 25 of the gear 20 and intersect in a line 26 which also passes through the apex 25 if the teeth and tooth spaces of the gear are to taper in width and height from end to end.

Disregarding at first the bottom 28 of the tooth space, it will readily be seen that the V-shaped profile formed by the tangential planes 24 and 24' could be swept out with a milling cutter having a V-shaped cutting profile, by feeding the milling cutter in the direction of the line 26. The tooth bottom 28 which is inclined to the line of feed 26 could, then, be cut by making the cutting teeth of the cutter, which are to cut at the small end of the tooth space, suitably higher than those which are adapted to cut at the large end of the space. Then, if the cutter is made so that it need make only one revolution per feed cycle, and its cutting edges are shaped to cut at different points along the length of the tooth as the cutter rotates and feeds along the length of the tooth, the desired tooth space shape can be cut. The outside cutting edges of the cutter would be arranged in a spiral conjugate to the straight bottom 28 of the tooth space. This spiral is an involute on cutters which are fed across the face of the blank at a uniform rate.

The next step in determining the structure of the cutter, which is to be employed, is to provide concave cutting edges on the blades of the cutter which are suited to produce the desired convex profiles 30 and 30' of opposite sides of the tooth space. If these cutting profiles were arranged at a constant distance from the cutter axis as on conventional milling cutters, then the tooth surfaces produced would have straight line elements parallel to the line of feed 26. In the embodiment of the invention illustrated in Figs. 5 and 6, however, we desire to produce tooth surfaces having substantially straight line elements 33 that extend through the cone apex 25 of the gear. This can be achieved by constructing the cutter so that the centers of curvature of opposite side cutting edges of successive blades of the cutter are displaced from one another in the direction of the tangents 24 and 24', see Fig. 2.

Here 35 denotes a milling cutter made according to the present invention to produce the desired tooth profile shapes on the gear 20. The axis of this cutter is denoted at 36. 37 is the center of the profile of the cutting edge of the blade of the cutter which cuts at the mean point P of the tooth surface. 38 and 39 are the centers of curvature of the cutting edges of the blades which cut at the large and the small ends of the tooth surfaces, respectively. The centers 38 and 39 are displaced from the center 37 along the line 40 which is parallel to the tangent plane 24.

Uniform displacement of the cutting profile centers 38, 37 and 39, etc. will produce tooth surfaces on the gear which contact with the tangential plane 24 along a straight line inclined to the direction of feed 26. It will readily be understood that by suitably selecting the rate of displacement of the profile centers, that is, the spacing of the centers of successive blades from one another, any desired straight line of contact between the cutter and the tooth surface being cut may be arrived at, such as a line 33.

As yet, however, we would only get tooth surfaces of substantially constant profile shape along the length of the gear tooth. The final step is to devise a way for obtaining tooth profiles on the gear teeth, which are increasingly curved from the large to the small end of the teeth, while employing a cutter whose cutting edges are of constant profile curvature.

Contact between the cutting surface in which all the cutting edges of the cutter lie, and the tooth surface being produced upon the gear is along the radial profile of the cutting surface only when the curvature center 37 remains in the same position relative to the cutter axis 36 for all cutting edges of the cutter and is not moved along a line 40 parallel to tangent 24. In such a case, the cutting surface is a surface of revolution concentric with the cutter axis. If the center of the cutting profile is moved from 37 to 38 and to 39, the cutting surface swept out by the cutter in its rotation about its axis 36 ceases to be a surface of revolution and the contact between the cutting surface and the tooth surface which is being produced, ceases to be in the radial plane of the cutter.

In the cutting of a gear according to this invention, as already described, the cutter rotates on its axis and is simultaneously moved along the length of the gear tooth being cut. The relative cutting motion, then, is as if a circle 43 (Fig. 6) concentric with the cutter axis 36 were rolling on a straight line 44 parallel to the line 26. 45 is the instantaneous axis of this rolling motion. The line of instantaneous contact between the cutter surface and the tooth surface finished thereby is subject to the requirements of gear contact and is the projection of the instantaneous axis to the cutter surface. Point P is a point of this projection and the line of contact is found to be a line 46 inclined to the radial plane 47 of the cutting surface of the cutter.

An analysis for determining the direction of the line of contact 46 at point P and further information is given hereafter.

Inasmuch as the cutting surface of the cutter and the tooth surface being produced thereby contacts along the inclined line 46, the profiles of the cutter surface and of the tooth surface in the radial plane 47 are bound to differ from one another. A concave circular cutting profile 48 (Fig. 2) having a radius 49 and a center 37 produces, therefore, a tooth profile 50 which is more curved than the cutting profile 48 and which has a radius 51 and a curvature center 52. The difference in curvature between the cutting surface and the tooth surface being produced increases with increasing cutter diameter and also with increasing inclination of the element 33 of the tooth surface to the direction of feed 26.

It is now apparent that a given cutting profile 48 (Fig. 2) will produce increasingly curved tooth profiles, the faster its center is displaced along the line 40 parallel to the tangent plane 24 and the more the element 33 of the tooth surface produced is inclined to the direction of feed 26. Here now is the basis for obtaining varying tooth profile curvature with a cutter having cutting edges of constant profile curvature.

What I propose to do is to provide not a uniform displacement of the positions of the centers of successive cutting edges of the cutter along the line 40, but a cutter in which the displacement of the centers of successive cutting edges is at a varying rate so that the center of the profile of the cutting edge which cuts at the small end of the gear tooth will be displaced further along the line 40 from the mean center 37 than the center of the profile of the cutting edge which cuts at the large end of the gear tooth. Thus, instead of having the centers of the profiles of the cutting edges which cut at the small end and at the large end of the tooth located at 39 and 38, respectively, equi-distant from the mean center 37, I propose to make the cutter so that the centers of the cutting edges of the blades, which cut at the small end and at the large end of the tooth, respectively, are located at the points 39' and 38', respectively.

In Figs. 3 and 4, 41 and 42 denote, respectively, the blades which cut at the large and the small ends, of the tooth space. The radius of curvature 49 of the side cutting edge 53 (Fig. 3) of the blade 41 which cuts at one side of the tooth space is the same as the radii of curvature 49 of the other side cutting edges 48 (Fig. 2) and 54 (Fig. 4) which cut on that same side of the tooth space but as stated, the centers 38', 37 and 39' of these different cutting edges are displaced from one another in the direction of tangent 24.

The centers of the cutting edges of the blades which cut at other points along the length of the gear tooth are disposed between the extreme positions 39' and 38'. The centers of the profiles of successive cutting edges of the cutter may then be considered as arranged on a conical or three-dimensional spiral coaxial with the cutter axis 36. The lead of this spiral becomes increasingly larger for the cutting edges which are coordinated to the small end of the gear tooth so that the tooth profile produced at the small end of the gear tooth may be much more curved than the cutting edge which cuts at that end of the tooth, whereas at the large end of the gear tooth, the tooth profile produced will differ only a little from the cutting edge which operates at that end of the tooth.

The positions of the centers of the cutting profiles of successive cutting edges along the line 40 parallel to the tangent 24 is reflected in the tooth shape produced upon the gear. The line of contact 55—P—56 between the tooth surface and the tangential plane 24 at P is no longer a straight line, but becomes a curve whose concave side faces the tooth bottom 28. The curve is shown exaggerated in the drawings.

Figure 1:
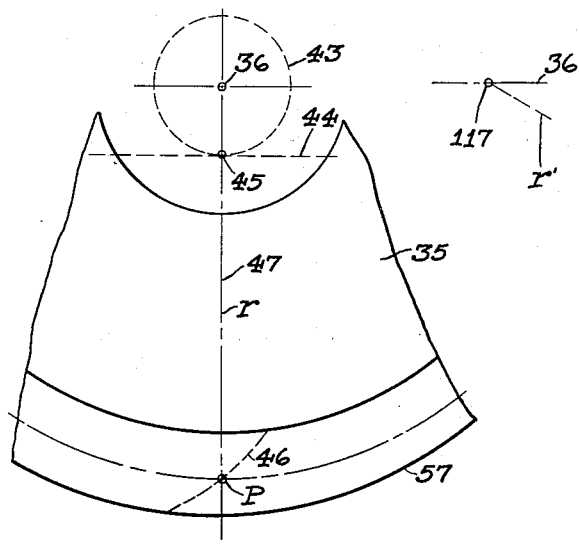
Fig. 1 is a fragmentary diagrammatic elevational view and Fig. 2 is a fragmentary diagrammatic sectional view of a cutter made according to this invention.
Figure 2:
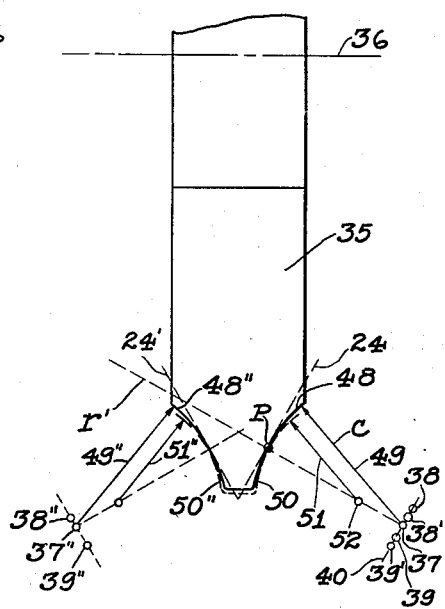

The cutter which is used to cut the tooth surface 30, then, will have cutting blades whose top cutting edges are arranged as indicated at 57 (Fig. 1) in a spiral about the cutter axis 36, according to the principles described and whose side cutting edges are of uniform circular arcuate curvature but have the centers of curvature of successive side cutting edges displaced from one another inwardly and laterally along a spiral of varying lead, as indicated in the case of the centers 39', 37 and 38' shown in Fig. 2. When this cutter is rotated in engagement with the gear blank and simultaneously fed across the face of the blank, it will produce teeth whose profile curvature changes in the desired fashion from the large to the small end of the teeth and whose depth will also vary in the desired fashion from the large to the small end of the teeth.

What has been said about one side of the gear teeth and the cutting edges for producing the same applies equally, of course, to the other side of the teeth and the cutting edges for producing the same. Hence, a cutter made according to the present invention can be used to cut both sides of a tooth space of a tapered gear simultaneously to tapering depth and tapering width. In Fig. 2, 37", 38", 39" denote centers of curvature for the opposite side of the tooth space corresponding, respectively, to the centers 37, 38' and 39', while 49" and 51", respectively, are the radii of curvature of the cutting edge 48" and the tooth profile 50" cut thereby, corresponding in this respect to radii 49 and 51, respectively and profiles 48 and 50, respectively.

The gear 60, which is to mate with the gear 20 (Fig. 7), is made in the same way as the gear 20. 61 is the axis of this gear, 62 its apex and 63 a straight line element of its pitch surface. The line 65 denotes a line of contact between the cutting surface of the cutter, which is used to produce the gear 60, and the tooth surface 66 cut thereby. P is a mean point of contact between the cutting surface and the tooth surface, and 67 is a line of contact between the tooth surface and a plane tangent to the tooth surface at said mean point P. This line of contact 67 is again a curved line and faces the bottom 68 of the tooth space of the gear 60. Hence, when the pair of gears 20 and 60 are in mesh, the lines of contact of mating tooth surfaces of the gears with a common tangent plane will be oppositely disposed with reference to the elements 33, 63 of the tooth surfaces. As will readily be understood, the result is that the mating tooth surfaces of the gears will not contact along their full length but will have a slight mismatch or relief at the tooth ends. The teeth, however, will be kinematically correct and mismatch is a desirable characteristic.

Often more mismatch is desired at the tooth ends than is obtainable with the method of cutting discribed. Additional mismatch, or localization of tooth bearing, may be obtained conveniently, then, with the principles laid down in my prior Patent No. 1,733,326 to which reference has already been made above.

Figs. 8 and 10 show a pair of gears cut to obtain greater localization of tooth bearing in accordance with the principles of this prior patent. The axes of these gears are denoted at 72 and 73, respectively, and their apexes at 74 and 75, respectively. The lines 76 and 77 denote, respectively, elements of their pitch surfaces and the lines 78 and 79, respectively, denote the directions of feed of the cutters employed in producing these gears. The curved line 80 denotes the line of contact between a tooth surface 82 of the gear 70 and a common plane tangent to this tooth surface and the tooth surface 83 of the mate gear 71, when the pair of gears are in mesh. The curved line 81 is the line of contact of the tooth surface 83 with this common tangent plane. The curved lines 80 and 81 have tangents 84 and 85, respectively, at the mean points 86 and 87, respectively, of the tooth surfaces, whose inclinations $i$ and $i'$, respectively, may be determined in accordance with the principles of said Patent No. 1,733,326. The inclinations of the tangent lines are substantially proportional to the radii of curvature of the tooth profiles of the two gears.

In the illustrated embodiment, the tangents 84 and 85 are less inclined to the directions of feed 78 and 79, respectively, of the cutters than the elements 76 and 77, respectively. This is the present preferred embodiment of the invention.

Figure 11:
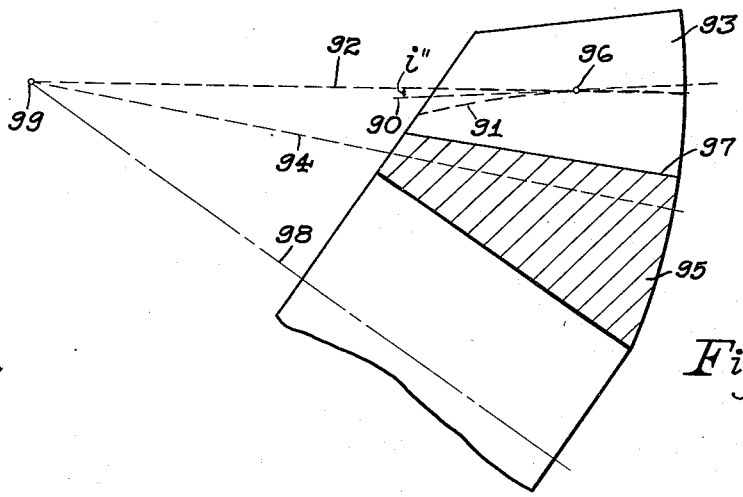
Fig. 11 is a fragmentary axial sectional view of a bevel pinion made according to a further modification of the invention.

Fig. 11 illustrates an embodiment of the invention where the tangent 90 to the line of contact 91 is inclined in the opposite direction to the element 92 of the tooth surface 93 so that its inclination to the line of feed 94 of the cutter is increased. The line of contact 91 between the tooth surface 93 of the gear, here denoted at 95, and the tangential plane at the mean point 96 is again a curve whose concave side faces the tooth bottom 97 and which has a general direction equal to the direction of its tangent 90. The axis of the gear is denoted at 98, its apex at 99 and the angle of inclination of the tangent 90 to the element 92 is denoted at $i''$.

In all of the above cases, the line of instantaneous contact between the cutting surface of the cutter and the tooth surfaces finished thereby is inclined to the radial plane of the cutter. The inclination is usually in excess of 30° and it is in the same direction on both sides of a tooth space. That is, the lines of contact on both sides of the gear teeth extend from the bottom of the tooth at the small end thereof toward the top of the tooth at the large end thereof. On gears of standard proportions, the inclination of these lines of instantaneous contact to the radial plane of the cutter is particularly marked on the pinion, because of the long addendum ordinarily used on bevel pinions. On the gear where the tangents to the opposite sides of a tooth space usually include a smaller angle with each other than on the pinion, the line of instantaneous contact is often so much inclined to a radial plane of the cutter that it departs only slightly from the general direction of the tooth surface.

The cut made by each individual cutting edge of a cutter nearly coincides with the line of instantaneous contact, particularly when a large number of cutting edges is provided. In any case, the characteristics stated for the lines of instantaneous contact are true also for the cuts of the individual cutting edges. We may therefore say that the tooth sides of a gear produced according to the present invention are surfaces enveloped by a suitable number of concave cuts, which extend in a general direction from the bottom of the tooth surfaces at the small end upwardly and backwardly toward the large end of the tooth on both sides of a tooth space. It should be noted that the cuts are inclined to the lines of instantaneous gear contact so that smooth tooth action is obtained in a pair of gears rolled together, even though the number of cutting edges in the cutter be relatively small and the tooth surface produced consequently contain cutter marks.

Fig. 9 illustrates diagrammatically the structure of a cutter such as may be employed in the cutting of the pinion shown in Fig. 8. The cutting surface of the cutter contains a basic V-shaped contour formed by the tangents T and T'. The side cutting edges have a basic circular profile of constant radius. The opposite side cutting edges which operate at a mean point along the length of the tooth space are denoted at 100 and 100', respectively. In the view I have shown superimposed upon these, the cutting edges 101, 101' and 102, 102', respectively, which cut at the large and small ends of the tooth space, respectively. The center of the profile 100 is denoted at 103 and its radius at 104.

Points 105 and 106 of the line of contact 80 (Fig. 8) of the tooth surface 82 with a plane tangent to the tooth surface at the mean point 86, are equally spaced from the mean point 86 measured in the direction of feed 78 of the cutter and correspond to equal angles of rotation of the cutter. Points 105 and 106 also appear in Fig. 9 as points of the basic profile T—78—T' of the cutter.

It is noted that the distance 86—105 is greater than the distance 86—106 and that therefore the lead of the basic cutting profile 100 increases from the large to the small end of the gear tooth 82. In this lead, the profile center 103 describes a line 107 which is parallel to the tangent T. The cutting profile, that is, the profile of successive cutting blades of the cutter in a plane radial of the cutter axis gradually changes from the profile 101 for the blade which cuts at the large end of the gear tooth at the point 106 to the profile 100 which cuts at the mean point 86 and to the profile 102 which operates at the point 105 adjacent the small end of the tooth.

In other words, the radii of curvature 104 of the cutting edges 101, 100 and 102 are the same but the centers 108, 103, 109 of curvature of these cutting edges are displaced from one another in the direction of the line 107. It will be noted, too, that the heights of the blades vary. This is to obtain the desired taper in depth of the tooth space from one end to the other. Thus the tip of the cutting blade which cuts at the large end of the tooth space is denoted at 110, the tip of the blade which cuts at the mean point 86 is denoted at 111 and the tip of the blade which cuts at the small end of the tooth space is denoted at 112. It will be observed that the blade which cuts at the small end of the tooth space is of greatest height. The tip cutting edges of the blades of the cutter are arranged in a spiral, as already described, which is conjugate to the tooth space bottom which is to be produced.

We have already pointed out that the line of instantaneous contact 46 (Figs. 1 and 6) between the cutter and the tooth surface is oblique because it is the normal projection of instantaneous axis 45 to the cutting surface. While this can be verified with the known methods of descriptive geometry, we shall add nevertheless an analysis which gives closely approximate results more directly.

Figs. 12 to 14 inclusive are extremely or infinitely enlarged views of the tangential plane 24 to the tooth surface 21 of the gear 20 at the mean point P. Line 113, extending through points P and 114, is the line in the cutting surface of the cutter which corresponds to line P—55 of the tooth surface (Fig. 6). Line 113 appears as a straight line in the enlargement shown. Line 113 is inclined to the peripheral direction, that is, to a line normal to the cutter radius, at the lead angle $\delta'$ in the conical surface of the basic cutting profile 24. (Fig. 5.) Lead angle $\delta'$ is related to the inclination $\delta$ of the line 115 (Figs. 6 and 13) at P with respect to the line 116, which is also the direction of feed. $\delta$ is measured in the tangential plane.

With $r$ equal to radial distance 36—P (Fig. 1) and $c$ equal to distance 36—45, we obtain in known manner:

$$r \tan \delta' = c \tan \delta$$
$$\tan \delta' = \frac{c \tan \delta}{r}$$

The cutting surface in the immediate vicinity of the point P can be described by bodily moving the radial cutting profile of the cutter along the line 113 while at the same time moving it slightly along 24 (Fig. 5) so that the profile point at line 113 remains continuously in contact with the conical cutting surface described by the profile tangent. In other words, the ordinate $z$ of any point of the cutting surface above the tangential plane can be considered as composed of the ordinates of the cylindrical surface described by moving the radial cutting profile along tangent 113 and of the ordinates of the conical surface described by the profile tangent 24 when rotated about the cutter axis. The resulting ordinate is the difference between the two individual ordinates.

In our present second-order approximation, the conical surface of tangent 24 departs from the tangential plane at P like a cylindrical surface having the same straight line element at P and the same normal radius $r'$ (Fig. 2) as readily understood. The normal radius $r'$ is the distance P—117 (Fig. 2) of the point P from the cutter axis measured along the normal to the cutting surface. 117 is the point of intersection of the normal with the cutter axis 36.

What is true of the ordinates $z$ is also true of their derivatives, that is, of the inclination of the normals to the cutter surface. These surface normals may be plotted as vectors and geometrically added as such.

Take a point 120 (Fig. 12) having a distance $x$ from the line 121 and a distance $y'$ from the line 113. The normal at 120 to the conical or cylindrical surface extending along the line 121 is inclined at an angle whose tangent:

$$i' = \frac{x}{r'}$$

in a direction parallel to line 116 and perpendicular to line 121.

Let $C$ denote the radius of the profile of the cutting surface in a radial plane of the cutter, that is, substantially the radius of the side cutting edges of the cutter, that is, the distance 49 (Fig. 2). Let $R$ equal the curvature radius of the produced tooth surface in a normal section passing through the mean point P and perpendicular to its line of contact 115 (Fig. 6) with the tangential plane at P.

The radius of the cylindrical surface extending along the line 113 is then $$C \cos^2 \delta'$$

and the normal at point 120 is inclined in a direction perpendicular to line 113 at an angle whose tangent is $$I = \frac{y'}{C \cos^2 \delta'}$$

and $$y' = (y - x \tan \delta') \cos \delta'$$

where $y$ is the ordinate of the point 120 with reference to line 116 and $x$ is the abscissa.

Through transformation, $$I \cos \delta' = \frac{y'}{C \cos \delta'} = \frac{y - x \tan \delta'}{C}$$

This gives the vector ordinate. The vector abscissa is equal to $$I \sin \delta' + i' = \left(\frac{y - x \tan \delta'}{C}\right) \tan \delta' + \frac{x}{r'}$$

The vector components, when geometrically added, give a resultant $I'$, see Fig. 12, which describes the direction and inclination of the surface normal at point 120.

At the line of contact 46 (Figs. 2, 6 and 13), the normals of the cutter surface and the produced tooth surface coincide. Accordingly both the direction and amount of inclination of the normals must be the same on both the cutting surface and on the tooth surface produced.

Hence: the ratio of the vector abscissa to the vector ordinate is equal to $$\tan \delta' + \frac{x}{r'} \cdot \frac{C}{y - x \tan \delta'} \text{ and to } \tan \delta$$

$$(\tan \delta - \tan \delta')(y - x \tan \delta') = \frac{x}{r'} \cdot C$$

$$(\tan \delta - \tan \delta')\left(\frac{y}{x} - \tan \delta'\right) = \frac{C}{r'}$$

$$\frac{y}{x} = \tan w$$

where $w$ is the angle between the line of contact 46 and the line of feed 116

$$(\tan \delta - \tan \delta')(\tan w - \tan \delta') = \frac{C}{r'}$$

$$\tan w = \tan \delta' + \frac{C}{r'(\tan \delta - \tan \delta')} \quad (2)$$

The vector ordinate or ordinate component of the inclination of the normal of the produced tooth surface is $$(y - x \tan \delta) \frac{\cos^2 \delta}{R}$$

It must be equal to the ordinate component given above, that is, equal to $$\frac{y - x \tan \delta'}{C} = (y - x \tan \delta) \frac{\cos^2 \delta}{R} \text{ and}$$

$$\frac{\left(\frac{y}{x} - \tan \delta'\right)}{C} = \frac{\tan w - \tan \delta'}{C} = (\tan w - \tan \delta) \frac{\cos^2 \delta}{R}$$

From Equation 2 we have $$\tan w - \tan \delta' = \frac{C}{r'(\tan \delta - \tan \delta')}$$

Hence:

$$\frac{C}{r'(\tan\delta - \tan\delta')C} = \frac{\cos^2\delta}{R}\left[\frac{C}{r'(\tan\delta - \tan\delta')} - (\tan\delta - \tan\delta')\right]$$

$$\frac{R}{\cos^2\delta} = C - r'\cdot(\tan\delta - \tan\delta')^2 \quad (3)$$

$$\frac{R}{\cos^2\delta} = C - r'\cdot\tan^2\delta\cdot\left(1-\frac{c}{r}\right)^2 \quad (3a)$$

$$\frac{R}{\cos^2\delta} = C - r'\cdot\tan^2\delta'\cdot\left(\frac{r}{c}-1\right)^2 \quad (3b)$$

$\dfrac{R}{\cos^2\delta}$ is here the radius of curvature of the gear tooth profile in a section perpendicular to the direction of feed, that is, in the same section in which the radius C is equal to 49 (Fig. 2) is taken.

It is known how $\dfrac{R}{\cos^2\delta}$ the radius of profile curvature, should change along the teeth of a bevel gear. Accordingly, we determine first the normal radius $r'$ and the rate of feed of the cutter along the length of the gear tooth $c/r$ from the normal requirements, and then change $\tan\delta$ along the gear tooth just enough to obtain the desired different profile radii at various points along the tooth.

The above Formula 3 therefore enables us to arrive at the rate of change of $\tan\delta$ and therefore at the required curvature of the line 115.

At the mean point P (Fig. 14) we provide an inclination $\delta$ as arrived at from the requirements of tooth design and lengthwise mismatch of the tooth surfaces of mating gears. At point 56 (Figs. 6 and 14) nearer to the large end of the tooth, we provide a smaller inclination of the tangent 125 so that the tooth profile curvature differs less from the curvature of the cutting edge which produces the same. At point 55 nearer to the small end of the gear tooth, the inclination of the tangent 126 is made larger than the inclination of the mean tangent 113 so that the tooth profile produced is more curved than the cutting edge which produces the same.

Figure 3:
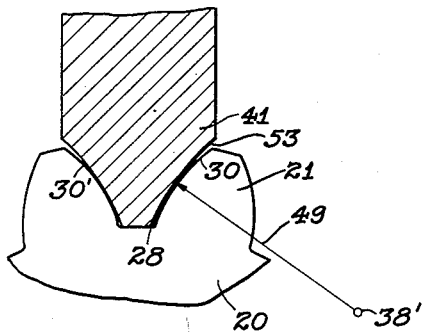
Fig. 3 is a diagrammatic view showing the cutter in the operation of cutting at the large end of a tooth space of a tapered gear and showing the shape of the cutter blade which cuts at this end of the tooth space.

In the embodiment of Figs. 1 to 3 inclusive, a profile curvature radius $$\frac{R}{\cos^2\delta}$$

in direct proportion to the cone distance is desired. With $A\cos\delta$ equal to the distance 29—25 measured along the direction of feed 26 (Fig. 6), the desired change at an abscissa $x$ of point 120' (Fig. 13) from mean point P is $$\frac{x}{A\cos\delta}\cdot\frac{R}{\cos^2\delta}$$

where $\delta$ is the inclination at the mean point P.

According to Formula 3a, the change in $$\frac{R}{\cos^2\delta}$$

is, $$r'\left(1-\frac{c}{r}\right)^2\cdot x\cdot\frac{d(\tan^2\delta)}{dx}$$

Then $$\tan\delta = \frac{dy}{dx}$$

$$\frac{d(\tan^2\delta)}{dx} = 2\tan\delta\frac{d^2y}{dx^2}$$

Accordingly, $$r'\left(1-\frac{c}{r}\right)^2\cdot 2\tan\delta\frac{d^2y}{dx^2} = \frac{R}{\cos^2\delta\cdot(A\cos\delta)}$$

$$\frac{d^2y}{dx^2} = \frac{R}{(\cos^2\delta)r'\left(1-\frac{c}{r}\right)^2\cdot 2A\sin\delta}$$

The radius of curvature of the line 115 may readily be determined from the above term $$\frac{d^2y}{dx^2}$$

and ordinarily will be found to be so large as to be hardly noticeable to the eye.

It has been assumed above that the feed is in a direction as though the circle 43 (Fig. 6) were rolling upon a straight line 44. This means that the work is fed with the cut for finishing. However, it is also possible to have the feed take place in the opposite direction for finishing. The relative motion then is as if the circle 43' were rolling on the straight line 44'. In this case the radius 36—130 of the rolling circle 43' should be introduced as a negative quantity in the above formulas. In both cases, the feed illustrated by the rolling circles 43 and 43', respectively, is uniform, that is, in direct proportion to the cutter rotation.

It is within the contemplation of the invention, however, to employ a non-uniform feed, also, where desirable. In this case the lead of the circular cutting profiles along the tangent 24 (Fig. 2) may be made uniform, that is, the centers 38, 37 and 39 which correspond to equal angles of rotation of the cutter are also equally spaced from one another. In other words, we can achieve the same results with a varying feed rate and a cutter whose successive cutting edges have their centers of curvature displaced uniformly from one another as we can obtain from a constant feed rate and a cutter whose successive cutting edges have their centers of curvature displaced at a varying rate from one another. The reason is apparent from Formula 3b. Where the rate of displacement of the centers of successive cutting edges of the cutter is uniform, $\tan\delta$ is constant, but $c$ is variable. $c$ may therefore be determined for various points along the tooth to give the desired profile radius. The feed rate required varies like $c$ along the tooth as will be readily understood.

A further embodiment of the invention resides in the combination of the two embodiments already described. The cutter may have cutting edges the centers of curvature of which are displaced at a changing rate from one another and such a cutter may be fed along the gear tooth being cut at a variable feed rate. This embodiment of the invention has the advantage that the range of a given cutter is increased so that the same cutter may be used for cutting a wide variety of gears. However, either of the two embodiments of the invention first described have considerable range of use, for a given cutter may be made to cut gears of different tooth conformation simply by changing the rate of feed of the cutter along the tooth.

Because of the possibility of varying the rate of feed of the cutter as it moves along the gear tooth, the invention may be employed with distinct advantage also in the cutting of cylindrical gears, such as spur and helical gears, because with the cutter and the method of the present invention it is possible to obtain any desired amount of localization of tooth bearing on such gears.

The cutter used for spur gears will have the centers of the corresponding side-cutting edges of successive blades arranged on a spiral of uniform lead. Such a cutter will sweep out a cylindrical surface which is inclined to the pitch surface of the spur gear being cut. By using the principles of my prior patent above mentioned, then, a pair of spur gears may be cut which will mesh with localized tooth bearing.

The feed along the teeth of tapered gears during the finishing cut is considerably longer than the face width of the gear being cut. This is due to the long, smooth finishing cuts taken by the cutter as it rotates on its axis and moves along the length of the gear tooth. The character of such cuts is indicated diagrammatically by the dash lines 135 in Fig. 8. As is clearly seen, the finishing cuts are along lines inclined to the radial plane 136 of the cutter. They extend in the same direction on opposite sides of the tooth space.

The length of the feed movement during the finishing operation is at least 50% greater than the face width of the gear. The length of the finishing cut has the advantage of equalizing the stresses during different phases of the individual cuts and provides higher accuracy and improved finish on the tooth surface being produced.

The preferred method of cutting gears according to this invention by successive roughing and finishing cuts will now be described in more detail. This method broadly may be applied in the use of any disc-type rotary cutter which is constructed to perform a single revolution per feed cycle. Thus this method is applicable also to the cutters described in my pending application above mentioned.

In Fig. 15, 140 denotes a bevel gear or pinion which is to be cut and 141 is the center or axis of the cutter, which is employed in the cutting of this gear, when the cutter is operating at a mean point along the length of a tooth 142 of the gear. The dotted line 143 denotes the spiral tip surface of the cutter when its center is at the mean position 141. The cutter is assumed to be turning continuously in the direction of the arrow 145 during the cutting operation and in the finishing operation such relative feed movement is produced between the cutter and the gear blank as if the circle 147 circumscribed about the axis 141 of the cutter were rolling on a line 148 which is parallel to the direction of feed 149 and inclined slightly to the bottom 150 of the tooth space being cut. For the cutting operation, the gear blank 140 is adjusted to an angle with respect to the direction 149 of feed smaller than its root angle.

152 denotes the line of instantaneous contact between the cutter surface and the finished tooth surface of the gear in the mean position. To completely finish the tooth surface the finishing cut is started with the cutter positioned so that its center is at 141' and the cutter is fed across the face of the blank as it rotates on its axis until it reaches the position 141". The lines of contact 152' and 152", respectively, which correspond to the cutter positions 141' and 141", respectively, then just reach the tooth surface 142 at opposite ends thereof. In actual practice, it is necessary to feed the cutter at both ends far enough to permit reversal of the direction of feed without shock. In the extreme positions of feed movement of the cutter, then, the cutter centers would attain positions such as 141a and 141b to permit of finishing between positions 141' and 141" at a uniform rate of feed.

The cutter may be made to finish cut only. In this case, it would have no rough-cutting edges and in this case the return feed from the position 141b to the starting position 141a may be effected very rapidly. The indexing of the gear may be performed during this return movement and while the gap in the cutter is abreast of the gear blank. Preferably, however, the cutter is provided with roughing as well as finishing blades so that it may successively rough and finish cut a tooth space in a single revolution. The roughing operation is then preferably partly or wholly performed during feed of the cutter from a position 141b to the position 141a and the finishing cut takes place during return movement from the position 141a to the position 141b. The gear is indexed, as before, when the gap in the cutter is abreast of the gear blank. In either case, when the cutter has made as many revolutions as there are tooth spaces in the blank to be cut, the gear will be finished.

In Figs. 17 and 18, I have shown a cutter made according to a preferred embodiment of the invention for rough and finish cutting a tooth slot in a single revolution of the cutter in accordance with the principles of the invention. The cutter comprises a rotary head 180 and a plurality of cutting segments 182 which are secured to the head by screws 183. Keys 184 which engage in spaced slots 185 in the head and seat against the backs of the cutting segments serve to position the segments angularly about the axis of the head. In the embodiment shown, each of the segments is provided with four integral cutting blades or teeth which are relieved on their side and top faces. These cutting blades or teeth may be sharpened to have cutting edges at both sides or alternate blades may have opposite side cutting edges. The first segment is denoted at 182a and the last segment at 182c.

There is a peripheral gap 186 between the last segment 182c and the first segment 182a which is of sufficient angular extent to permit of indexing the gear blank when this gap is abreast of the blank in the rotation of the cutter. The segments beginning with the segment 182a and including the segment denoted at 182b are provided with roughing blades or teeth while the segments 182d to 182c inclusive are provided with finishing blades or teeth. The finishing blades have side cutting edges of constant profile curvature according to the principles already given, the centers of the cutting edges of successive blades being disposed at progressively different distances from the axis of the cutter. The finishing blades are also of progressively varying height and their top cutting edges are accordingly arranged in a spiral, such as indicated at 187, in accordance with the principles hereinbefore set forth.

The roughing blades are preferably arranged like a circular broach, that is, they are preferably made of progressively increasing height to the height of the tooth space of the gear to be cut as a limit. The roughing blades may be and preferably are made with side cutting edges of circular arcuate curvature and preferably the centers of curvature of corresponding successive side-cutting edges of the roughing blades are progressively displaced from one another in a manner similar to the displacement of the centers of curvature of the side-cutting edges of the finishing blades. Thus, the roughing and finishing blades can be relief-ground in one continuous operation. Each roughing blade is, however, made of less thickness than the finishing blade which cuts at a corresponding point along the length of the tooth space of the gear. Thus stock will be left on the sides of the tooth space, after the roughing cut, to be finished in the finishing feed movement. Thus, as illustrated in Fig. 19, the roughing blade 182r which cuts at the large end of the tooth space is narrower than the finishing blade 182f which cuts at this same end of the tooth space.

To precisely position the segments 182 on the cutter head, the head is preferably made, as shown, with a conical shoulder 188 and a cylindrical peripheral seating surface 189 and these two surfaces are inclined at an acute angle to one another. The inner end faces 191 of the segments are then made cylindrical and complementary to the cylindrical surface 189 and the inside faces 192 of the segments are made conical and complementary to the conical surface 188 of the head against which they seat. When the bolts 183 are tightened, then, the segments are drawn down into the acute-angular seat formed by the surfaces 188 and 189 of the head and are thus accurately and rigidly held on the head.

The keys 184 are shaped complementary to the slots 185 of the head. As shown, these keys have plane-side surfaces 193 at one side which are radial of the axis 194 of the cutter head. The segments are made with plane end faces 195 which are adapted to be seated against the plane side faces 193 of the keys when the segments are positioned on the head. The holes in the head through which the screws 183 extend are made slightly larger in diameter than the screws to permit some angular adjustment to seat the end faces 195 of the segments against the keys. Thus the keys operate as precision positioning means determining the angular positions of the segments about the axis of the head.

By means of the keys, then, assurance is had that the several segments will occupy uniformly spaced positions about the axis of the head. Hence the cutting teeth of the segments will always project at proportionally constant amounts beyond the periphery of the head even after the cutter is sharpened so that the cutter will be accurate through its whole life.

In producing a tooth space of the gear blank, the cutter is adjusted into engagement with the blank so that it will cut to the full depth of the tooth spaces of the blank without any feed in the direction of tooth depth. The roughing cut begins with the cutter center at 141b and during the time the first few roughing blades are taking their cuts, there need not be any lengthwise feed movement of the cutter. The line 160 (Fig. 16) denotes the path of the first roughing blade of the cutter. After the roughing cuts have reached the point 161 of the tooth at the small end thereof, the feed movement may begin. At the point where the roughing cuts have reached full height, the feed of the cutter will have progressed to a point where its center is at 141 or to a point where its center is between the positions 141 and 141b.

162 denotes the path of the cutting blade at the end of depth roughing when the cutter center is at 141. From this point on, only the lower part of the sides of the tooth at the large end of the tooth space need to be roughed out. There is, therefore, only a moderate amount of stock required to be removed in the further roughing operation and therefore the rate of feed of the cutter may be accelerated to the point of reversal 141a. In the latter part of this roughing feed, the rate of feed movement may be even greater than the finishing feed. The finishing operation takes place, as already described, on the reverse movement while the cutter is being fed from 141a to 141b. The stock which has been left on the bottom of the sides of the tooth space at the small end thereof and which is denoted by the shaded area 163 in Fig. 16 is removed during the finishing feed movement and the removal of this slight amount of stock helps to balance the cutting load of the last finishing blade.

It is to be noted that with the cutter and method described, the total roughing cuts are included between the lines 160 and 162 which diverge from the small to the large ends of the tooth space. Likewise, successive roughing cuts diverge from the small to the large end of the tooth space so that the chips cut by the successive roughing blades are each of increasing thickness from the small to the large end of the tooth. Inasmuch as the cutter rotation is in the direction of the arrow 145, it will be seen, then, that the roughing cut starts at the small end of the tooth, that is, at the sides of reduced chip thickness. This is of advantage since it adds much to the life of the roughing blade for the life of any cutting blade is determined largely by the thickness of the chip which it has to take at the beginning of its cut. I have therefore devised a broaching operation for roughing tapered gears in which the stock is removed in tapered chips. The increase in chip thickness from the small to the large end of the tooth is usually between 40% and 70% of the chip thickness at the small end and the roughing chip extends practically for the whole length of the teeth. In development, the chips are of trapezoidal shape with the shorter side of the trapezoid at the start of the cut. This is precisely what is desired in preference to zero chip thickness at the start of the cut. It is readily seen that the above roughing method is bound to be very efficient in view of the long broaching cuts and tapering chip thicknesses.

If desired, the roughing cut may start with the cutter center in a position 141c. The path of the first roughing blade will then be the line 160'. It will be seen that this reduces the total chip thickness at the small end of the tooth, which is the starting point of the chip, still further. Starting of the roughing cut with the tool center at some position such as 141c or even to the left of 141c is especially desirable if a tool is employed that has only roughing blades. In this case, the end position of depth roughing is to the left of the point 141. In other words, full cutting depth is obtained before the cutter center has reached position 141.

Cutters for producing tapered gears according to this invention contain substantially circular cutting edges of constant profile radius but different position with respect to the cutter axis. More broadly, the cutting edges are such as may be obtained by bodily moving a constant curve without rotation, that is in a parallel position, sidewise and radially with respect to the rotating cutter. Specifically the center of the constant circle approximating the cutting edges describes a substantially straight line, when the cutter is rotated, which is inclined to the plane of rotation of the cutter due to the displacement of the centers of corresponding side cutting edges of successive blades. The motion along said line is at a changing rate as compared with the cutter rotation in the preferred embodiment of the invention and the rate of said motion increases rapidly with increase in displacement of the profile centers from the axis of the cutter.

As in my prior applications, it will be noted that the finishing cuts in the preferred direction of feed are along lines which extend from the top of the teeth at the large end toward the bottom at the small end. This long finishing contact makes for smooth and accurate finishing cuts. This same inclined finishing contact is also obtained in the cutting of helical gears but in the case of these gears, the lines of finishing contact are oppositely inclined on opposite sides of the gear teeth.

In Figs. 20 to 23 inclusive, I have illustrated a modification of the invention which may be employed where a smoother or a faster roughing cut is desired. This modification of the invention may be employed in the cutting of all kinds of gears, but is here shown as applied to bevel gears. Here a pair of disc cutters are employed. One of them is a pure roughing cutter, constructed simply to remove stock. The other is a combination roughing and finishing cutter, which is made according to the principles of this invention as already described, and which is intended to finish the tooth slots previously roughed out by the other cutter.

The roughing cutter is denoted at 200. It may be of any suitable construction. In the embodiment shown, it is in the form of a slotting tool having a plurality of slotting blades or teeth arranged part-way only around its periphery. The blades of this cutter are preferably made of progressively increasing height to cut deeper and deeper into the blank to the full height of a tooth space as the limit.

The slotting blades or teeth may be made in known manner, as illustrated. They are widest at their tips and have their opposite sides converging inwardly from their tips so as to clear the sides of the tooth slot being cut. One of the blades is shown in the sectional view of Fig. 20 and is denoted at 201. Fig. 22, which is a diagrammatic side elevational view of the slotting cutter, indicates how the blades increase progressively in height around the periphery of the cutter. The cutting portion of the cutter is denoted at 202. As is seen, the tip surfaces of the blades lie in a spiral 204 and there is a gap 203 between the last and first blades.

The cutter 210, which does the finishing, is made according to the principles of the cutters previously described, and, like the cutters previously described, contains preferably both roughing and finishing blades. It may be of the same general construction as any of the cutters previously described. The blades are arranged only part-way around the periphery of the cutter and preferably are made of progressively increasing height. In the diagrammatic view of Fig. 23, 212 denotes the cutting portion of the cutter and 214 denotes the spiral surface in which the tips of the roughing and finishing blades lie. There is a gap 213 between the last finishing and the first roughing blades of the cutter to permit of indexing. This cutter has curved side-cutting edges determined in accordance with the principles of the invention already set forth. One of the blades is shown in the sectional view at 211 in Fig. 20.

As will be noted from comparison of Figs. 22 and 23, the cutting portion 202 of the roughing cutter 200 occupies a smaller part of the periphery of that cutter than does the cutting portion 212 of the periphery of the cutter 210. This is because the slotting cutter 200 is preferably made so that none of its blades will be cutting while the finishing blades of the cutter 210 are in operation. With this construction, the final accuracy and the final finish of the tooth surfaces produced upon a gear being cut, are dependent solely upon the finishing blades of the cutter 210 and are not affected in any way by the slotting cutter 200.

In use, the two cutters 200 and 210 are rigidly connected to one another to rotate about a common axis 215 and they are spaced so that they will operate in adjacent tooth spaces of the gear 217 which is to be cut. The cutter 210 is positioned so that it will be radial of the gear axis 218. The cutters are rotated in engagement with the gear blank while the blank is held stationary on its axis and, as the cutters rotate in engagement with the blank, they are fed first in one direction and then in the other across the face of the blank. During feed of the cutters in one direction, the cutter 200 slots out a tooth space of the gear blank and the cutter 210 completes the roughing of a tooth slot which has previously been operated upon by the cutter 200. During this feed movement, all the blades of the slotting cutter and all of the roughing blades of the cutter 210 will have taken their cuts. On the reverse feed movement, the gap 203 in the slotting cutter will be abreast of the gear blank and the finishing blades of the cutter 210 only will be in operation and will finish-cut the tooth space of the blank previously operated upon by the roughing blades of this cutter. When the gap 213 in this cutter comes abreast of the blank, the blank may be indexed. The gap 203 in the cutter 200 is long enough to register with the gap 213 also. The indexing movement is in the direction of the arrow 219 (Fig. 19).

The operation of the slotting tool is clearly illustrated in Fig. 21. Here a plurality of blades 201a, 201b, 201c and 201d are shown. The blade 201a is one of the first blades to come into operation. The blade 201d is one of the last. The blades are preferably of uniformly increasing height as indicated by the blades 201b, 201c and 201d. It will be noted that it is only the tip cutting edges of the blades which cut. The sides of the blades are inclined away from the sides of the tooth space and do no cutting. It is not necessary, therefore, to relieve them. The slotting cutter is, therefore, a very inexpensive tool and adds very little to the total cost of the tool mechanism. At the same time, however, the operation of cutting a gear blank can be speeded up considerably where two cutters, such as shown, are employed or a smoother tooth surface finish and longer cutter life can be obtained.

In Fig. 20, the use of the two cutters is shown as applied to the cutting of a bevel gear blank. For cutting a spur gear blank, the principle is the same but the slotting cutter may be designed to reach further down into the tooth spaces of the blank and remove more stock. This is because the tooth spaces of a spur gear are of uniform width from end to end and their sides do not converge like the sides of tooth spaces of a bevel gear.

While several different embodiments of the invention have been illustrated and described, it will be understood that the invention is capable of various further modifications and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A rotary disc gear cutter having a plurality of radially disposed cutting blades arranged partway around its periphery with a gap between the last and first blades which is of sufficient angular extent to permit of indexing the gear being cut, when the gap is abreast of the blank in the rotation of the cutter, without relative withdrawal of the cutter from the blank, said blades having side-cutting edges which are inclined to the plane of rotation of the cutter and corresponding side-cutting edges of the blades having the same profile curvature.

2. A rotary disc gear cutter having a plurality of radially disposed cutting blades arranged partway around its periphery with a gap between the last and first blades which is of sufficient angular extent to permit of indexing the gear blank, when the gap in the cutter is abreast of the blank, without relative withdrawal of the cutter from the blank, corresponding side-cutting edges of successive blades being inclined to the plane of rotation of the cutter and being of a shape such as might be obtained by successive bodily displacements of a constant concave curve sidewise and radially with respect to the cutter axis.

3. A rotary disc gear cutter for cutting gears by continuous rotation of the cutter and intermittent indexing of the gear blank, said cutter having a plurality of radially disposed cutting blades of constant concave profile shape which are arranged part-way around its periphery with a gap between the last and first blades which is of sufficient angular extent to permit of indexing the blank, when the gap in the cutter is abreast of the blank, without relative withdrawal of the cutter from the blank.

4. A rotary disc gear cutter having a plurality of radially disposed cutting blades, corresponding side-cutting edges of successive blades being of circular arcuate shape and having the same radii of curvature but having their centers of curvature arranged on a three dimensional spiral about the axis of the cutter.

5. A rotary disc gear cutter having a plurality of radially disposed cutting blades, corresponding side-cutting edges of successive blades being inclined to the plane of rotation of the cutter and being of a shape such as might be obtained by successive bodily displacement of a constant line, and said blades being of progressively varying height.

6. A disc gear cutter comprising a rotary head and a plurality of cutting segments, each of which has a plurality of radially disposed integral cutting teeth, each of said segments having a conical side surface and a cylindrical bottom surface which is inclined at an acute angle to the side surface, and said head having complementary conical and cylindrical seating surfaces, and means for securing the segments to the head so that the conical and cylindrical surfaces of the segments seat against the corresponding surfaces of the head and the cutting teeth of the segments project beyond the periphery of the head.

7. A rotary disc cutter for cutting tapered gears, said cutter having a plurality of radially disposed cutting blades of progressively varying height which are adapted to cut at progressively different points along the length of a tooth space of the gear blank from one end thereof to the other, said blades having side-cutting edges of curved profile, the profile curvature of corresponding side-cutting edges of successive blades being constant, but successive blades having their side cutting edges displaced relative to one another both laterally and radially of the cutter axis, and the blade which is adapted to cut at the small end of the tooth space being of the greatest height.

8. A rotary disc cutter for cutting tapered gears, said cutter having a plurality of radially disposed cutting blades of progressively varying height which are adapted to cut progressively at different points along the length of a tooth space of a gear blank from one end thereof to the other, said blades having side-cutting edges of circular arcuate profile, the profile curvature of corresponding side-cutting edges of successive blades being constant, but the centers of curvature of the profiles of successive blades being displaced relative to one another both laterally and radially of the cutter axis, and the blade which is adapted to cut at the small end of the tooth space being of the greatest height.

9. A rotary disc cutter for cutting tapered gears having a plurality of peripherally arranged cutting blades, corresponding side-cutting edges of successive blades being of circular arcuate profile shape and having the same radii of curvature but having their centers of curvature arranged on a three-dimensional spiral about the axis of the cutter, said spiral being of changing lead, the lead of the spiral increasing to the blade that is coordinated to cut at the small end of the tooth spaces of the blank.

10. A rotary disc cutter for cutting tapered gears having a plurality of radially disposed roughing blades followed circumferentially by a plurality of radially disposed finishing blades, the finishing blades having side-cutting edges which are offset laterally with reference to corresponding side-cutting edges of the roughing blades, both the roughing and finishing blades being of progressively increasing height, the finishing blade which is of smallest height being adapted to cut at the large end of a tooth space of the gear blank and the successive finishing blades being adapted to cut progressively along the length of the tooth space to the small end thereof.

11. A rotary disc cutter for cutting gears having a plurality of peripherally arranged cutting blades, each of which has opposite side-cutting edges that are of circular arcuate curvature, corresponding side-cutting edges having the same radii of curvature and the centers of curvature of corresponding side-cutting edges of successive blades being displaced relative to one another.

12. A rotary disc cutter for cutting gears having a plurality of peripherally arranged cutting blades whose corresponding side-cutting edges are of constant circular arcuate curvature, the centers of curvature of corresponding side-cutting edges of successive blades being displaced non-uniformly relative to one another.

13. A rotary disc cutter for cutting gears having a plurality of peripherally arranged cutting blades whose corresponding side-cutting edges are of constant circular arcuate curvature, the centers of curvature of corresponding side-cutting edges of successive blades being displaced both laterally and radially of the axis of the cutter relative to one another.

14. A rotary disc cutter for cutting gears having a plurality of peripherally arranged cutting blades whose corresponding side cutting edges are of constant circular arcuate curvature, the centers of curvature of corresponding side-cutting edges of successive blades being displaced uniformly relative to one another both laterally and radially of the axis of the cutter.

15. A rotary disc cutter for cutting gears having a plurality of peripherally arranged cutting blades whose corresponding side cutting edges are of constant circular arcuate curvature, the centers of curvature of corresponding side-cutting edges of successive blades being displaced relative to one another at a non-uniform rate both laterally and radially of the axis of the cutter.

16. A rotary disc cutter for cutting gears having a plurality of peripherally arranged cutting blades whose side-cutting edges are of curved profile, the profile curvature of corresponding side-cutting edges of successive blades being constant but successive blades having their side-cutting edges displaced relative to one another.

17. A rotary disc cutter for cutting gears having a plurality of peripherally arranged cutting blades whose side-cutting edges are of concave curved profile, the profile curvature of corresponding side-cutting edges of successive blades being constant but successive blades having their corresponding side-cutting edges displaced relative to one another at a uniform rate both laterally and radially of the cutter axis.

18. A rotary disc cutter for cutting gears having a plurality of peripherally arranged cutting blades whose side-cutting edges are of concave curved profile, the profile curvature of corresponding side-cutting edges of successive blades being constant, but successive blades having their corresponding side-cutting edges displaced at a non-uniform rate relative to one another both laterally and radially of the cutter axis.

19. A rotary disc cutter for cutting gears, having a plurality of peripherally arranged cutting blades whose corresponding side-cutting edges are of constant circular arcuate curvature, the centers of curvature of corresponding side-cutting edges of successive blades being arranged on a spiral of uniform lead about the axis of the cutter.

20. A rotary disc gear cutter having a plurality of radially arranged cutting blades which have tip-cutting edges concentric of the axis of the cutter and which have opposite side cutting edges of concave profile that are symmetrically disposed with reference to a plane of rotation perpendicular to the axis of the cutter, corresponding side cutting edges of successive blades having the same profile curvature but having their profiles displaced relative to one another radially and axially of the cutter axis.

21. A rotary disc gear cutter having a plurality of radially disposed cutting blades which have tip-cutting edges arranged on a spiral about the axis of the cutter and which have opposite side cutting edges of concave profile shape that are symmetrically disposed with reference to a plane of rotation perpendicular to the axis of the cutter, corresponding side cutting edges of successive blades having the same profile curvature but having their profiles displaced relative to one another radially and axially of the cutter axis.

22. A rotary disc gear cutter having a plurality of radially disposed cutting blades which have tip-cutting edges concentric of the axis of the cutter and which have opposite side cutting edges of concave circular arcuate profile shape that are symmetrically disposed with reference to a plane of rotation perpendicular to the axis of the cutter, corresponding side cutting edges of successive blades having the same profile curvature, but having their centers of curvature displaced from one another radially and axially of the cutter.

23. A rotary disc gear cutter having a plurality of radially disposed cutting blades which have tip-cutting edges arranged on a spiral about the axis of the cutter and which have opposite side cutting edges that are of concave circular arcuate profile shape and that are symmetrically disposed with reference to a plane of rotation perpendicular to the axis of the cutter, corresponding side cutting edges of successive blades having the same profile curvature but having their centers of curvature displaced relative to one another radially and axially of the cutter.

24. A rotary disc gear cutter having a plurality of radially disposed rough-cutting blades followed circumferentially by a plurality of radially disposed finish-cutting blades, corresponding side-cutting edges of both the roughing and finishing blades being of the same profile shape, but successive corresponding side-cutting edges of each group of blades being displaced radially and axially of the cutter axis from one another, and the finishing blades having their side-cutting edges offset laterally with reference to corresponding side-cutting edges of the roughing blades.

25. A rotary disc gear cutter having a plurality of radially disposed rough-cutting blades followed circumferentially by a plurality of radially disposed finish-cutting blades, corresponding side-cutting edges of both the roughing and finishing blades being of constant circular arcuate concave profile shape, but successive corresponding side-cutting edges of each group of blades having their centers of curvature displaced radially and axially of the cutter from one another and the finishing blades having their side-cutting edges offset laterally with reference to corresponding side-cutting edges of the roughing blades.

26. A rotary disc gear cutter having a plurality of radially arranged cutting blades which have opposite side-cutting edges of constant profile curvature that are symmetrically disposed with reference to a plane of rotation perpendicular to the axis of the cutter, corresponding side-cutting edges of successive blades having the same profile curvature but having their profiles displaced relative to one another at a uniform rate radially and axially of the cutter axis.

27. A rotary disc gear cutter having a plurality of radially arranged cutting blades which have opposite side-cutting edges of constant profile curvature that are symmetrically disposed with reference to a plane of rotation perpendicular to the axis of the cutter, corresponding side-cutting edges of successive blades having the same profile curvature but having their profiles displaced relative to one another at a varying rate radially and axially of the cutter axis.

28. A rotary disc gear cutter having a plurality of radially arranged cutting blades whose corresponding side-cutting edges are of the same profile shape and whose opposite side-cutting edges are symmetrically disposed with reference to a plane of rotation perpendicular to the axis of the cutter, the profiles of successive corresponding side-cutting edges being displaced relative to one another radially and axially of the cutter axis, and the blades being of progressively varying height.

29. A rotary disc cutter for cutting tapered gears having a plurality of radially arranged cutting blades whose corresponding side-cutting edges are of the same profile shape and whose opposite side-cutting edges are symmetrically disposed with reference to a plane of rotation perpendicular to the axis of the cutter, the profiles of successive corresponding side-cutting edges being displaced relative to one another radially and axially of the cutter axis at a varying rate, the rate increasing toward the blade that is to cut at the small end of the gear teeth.

ERNEST WILDHABER.